US012603952B2

(12) United States Patent
Liu et al.

(10) Patent No.: US 12,603,952 B2
(45) Date of Patent: Apr. 14, 2026

(54) ELECTRONIC DEVICE

(71) Applicant: Beijing Xiaomi Mobile Software Co., Ltd., Beijing (CN)

(72) Inventors: Xinbo Liu, Beijing (CN); Wei Wang, Beijing (CN); Xuwang Cui, Beijing (CN); Shaoshu Sha, Beijing (CN); Yueliang Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 415 days.

(21) Appl. No.: 18/191,476

(22) Filed: Mar. 28, 2023

(65) Prior Publication Data

US 2024/0179231 A1 May 30, 2024

(30) Foreign Application Priority Data

Nov. 28, 2022 (CN) .......................... 202211505572.6

(51) Int. Cl.
*H04M 1/02* (2006.01)
*H01Q 1/24* (2006.01)

(52) U.S. Cl.
CPC .......... *H04M 1/0277* (2013.01); *H01Q 1/243* (2013.01); *H04M 1/0269* (2022.02); *H04M 2201/38* (2013.01)

(58) Field of Classification Search
CPC ............. H04M 1/0277; H04M 1/0269; H04M 2201/38; H04M 1/236; H01Q 1/243; H01Q 1/44; H01Q 1/242; H01Q 1/36
See application file for complete search history.

(56) References Cited

U.S. PATENT DOCUMENTS

2017/0033812 A1* 2/2017 Son ......................... H01Q 5/328
2019/0393919 A1* 12/2019 Youn ........................ H01Q 5/30

FOREIGN PATENT DOCUMENTS

CN 112332092 A 2/2021

OTHER PUBLICATIONS

Extended European Search Report issued on Sep. 6, 2023 for European Patent Application No. 23164691.0.

* cited by examiner

*Primary Examiner* — Zhitong Chen
(74) *Attorney, Agent, or Firm* — Volpe Koenig

(57) ABSTRACT

The disclosure relates to an electronic device. The electronic device includes a metal border and a support frame located in the electronic device, the metal border includes an adjacent first border section, a first function key is arranged on the first border section, and an antenna connection part extending inward is arranged on an inner side of the first border section, so as to form a first antenna with the first border section as an antenna body. The support frame is arranged on an inner side of the metal border, the support frame has an avoidance notch, the antenna connection part penetrates through the avoidance notch, or the avoidance notch accommodates an inner end of the antenna connection part, and the antenna connection part and the support frame are arranged at an interval.

19 Claims, 4 Drawing Sheets

ELECTRONIC DEVICE

CROSS-REFERENCE TO RELATED APPLICATIONS

The disclosure is proposed on the basis of and claims priority to the Chinese Patent Application No. 202211505572.6, filed on Nov. 28, 2022, and the entire content of which is incorporated herein by reference.

BACKGROUND

An antenna is an important part of an electronic device, and a communication function of the electronic device is realized through the antenna. At present, some electronic devices, such as mobile phones, in which part of an antenna structure of the electronic device with the help of a metal border of the electronic device is formed. However, when a user holds the border, the antenna structure may be blocked to a certain extent, which affects performance of the antenna. A common concern when the metal border is used as a part of the antenna structure is how to ensure the performance of the antenna.

SUMMARY

The disclosure relates to the technical field of terminals, in particular to an electronic device.

The disclosure provides an electronic device, including: a metal border, where the metal border includes a first border section, a first function key is arranged on the first border section, and an antenna connection part extending inward is arranged on an inner side of the first border section, to form a first antenna with the first border section as an antenna body; and a support frame, arranged on an inner side of the metal border, where the support frame has an avoidance notch, the antenna connection part penetrates through the avoidance notch, or the avoidance notch accommodates an inner end of the antenna connection part, and the antenna connection part and the support frame are arranged at an interval.

BRIEF DESCRIPTION OF THE DRAWINGS

To more clearly explain examples of the disclosure or technical solutions in the related art, accompanying drawings that need to be used in the examples or descriptions of the related art will be briefly introduced below. The accompanying drawings in the following descriptions are merely some examples of the disclosure, and for those ordinarily skilled in the art, other accompanying drawings may further be obtained according to these accompanying drawings without creative labor.

DETAILED DESCRIPTION

Examples will be described in detail here, and instances are shown in the accompanying drawings. When the following description refers to the accompanying drawings, unless otherwise indicated, the same numbers in different accompanying drawings indicate the same or similar elements. The implementations described in the following examples do not represent all implementations consistent with the disclosure. Rather, they are merely instances of apparatuses and methods consistent with some aspects of the disclosure as detailed in the appended claims.

The terms used in the disclosure are merely for the purpose of describing specific examples, and are not intended to limit the disclosure. The singular forms "one", "said", and "the" used in the disclosure and the appended claims are also intended to include plural forms unless the context clearly indicates other meanings. The term "and/or" as used here refers to and includes any or all possible combinations of one or more associated listed items.

Depending on the context, the word "if" can be interpreted as "at the time", "when", or "in response to determining".

The disclosure provides an electronic device, and the electronic device includes a metal border and a support frame located in the electronic device. The metal border includes a first border section and a second border section, which are adjacent to each other. A first break joint is formed between the first border section and the second border section, a first function key is arranged on the first border section, and an antenna connection part extending inward and located on an inner side of the first function key is arranged on an inner side of the first border section, to form a first antenna with the first border section as an antenna body. The support frame has an avoidance notch. An inner end of the antenna connection part is located in the avoidance notch, and the antenna connection part and the support frame are arranged at an interval. According to the above electronic device, the formed first antenna with the first border section as the antenna body makes it difficult for a user to hold a key part of the first antenna when using a mobile phone, which is conducive to improving a performance of the first antenna, and thus it is conducive to improving an overall performance of an antenna of the electronic device.

The electronic device provided by the disclosure may be a mobile phone, a tablet computer, a computer, or other electronic products with antennas.

Please refer to FIG. 1 to FIG. 8, and the electronic device provided by the disclosure is described in detail below.

Figure 1:
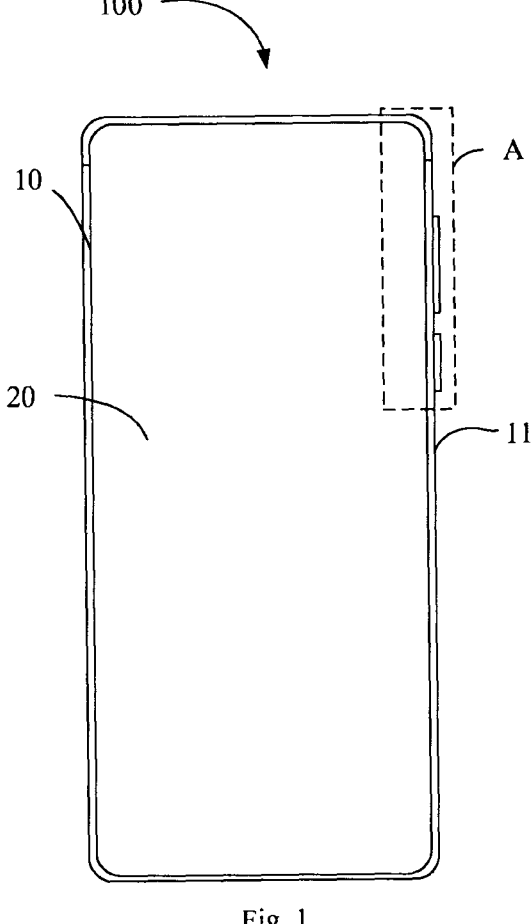
FIG. 1 is a front view of a partial structure of an electronic device illustrated according to an example.
Figure 2:
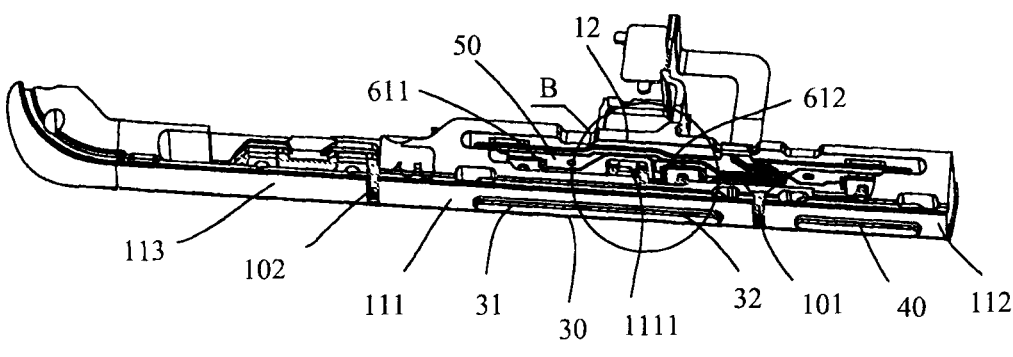
FIG. 2 is a partial three-dimensional structural diagram of a region A of an electronic device illustrated according to an example.
Figure 3:
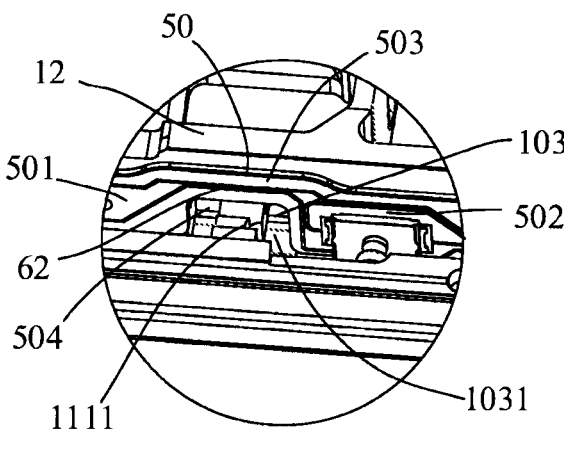
FIG. 3 is an amplified schematic diagram at B shown in FIG. 2.
Figure 4:
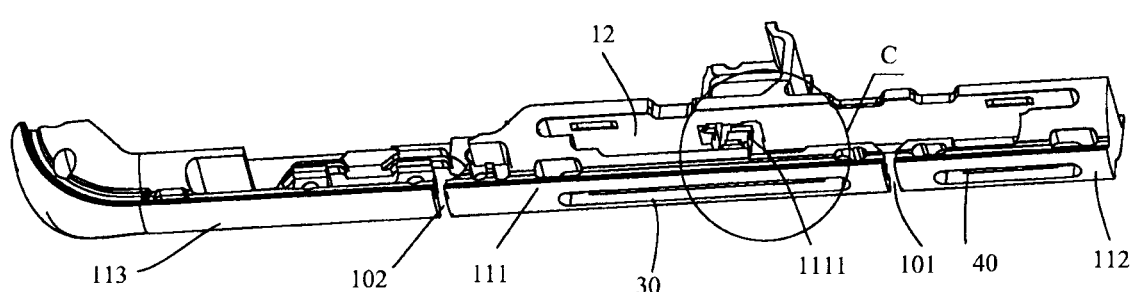
FIG. 4 is another partial three-dimensional structural diagram of a region A of an electronic device illustrated according to an example.
Figure 5:
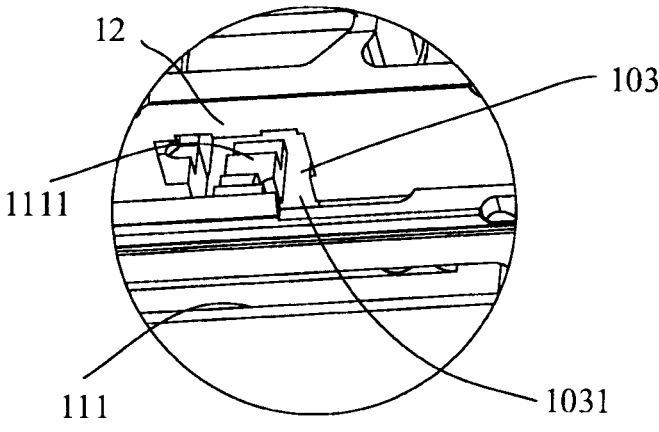
FIG. 5 is an amplified schematic diagram at C shown in FIG. 4.
Figure 6:
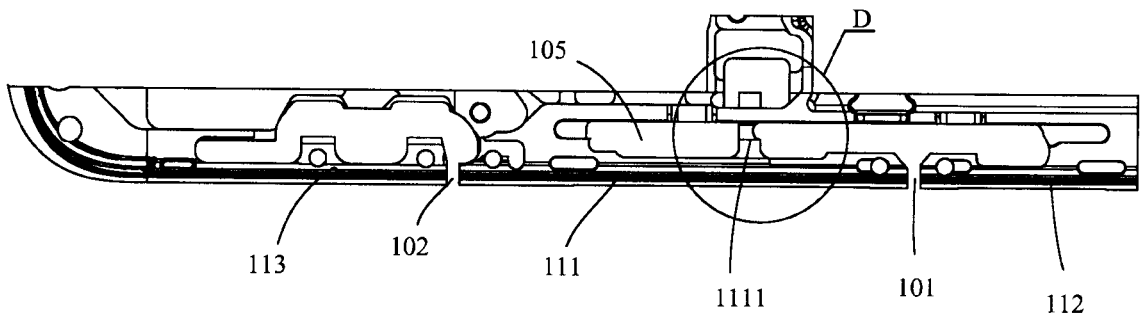
FIG. 6 is a side view of a viewing angle of a structure shown in FIG. 4.
Figure 7:
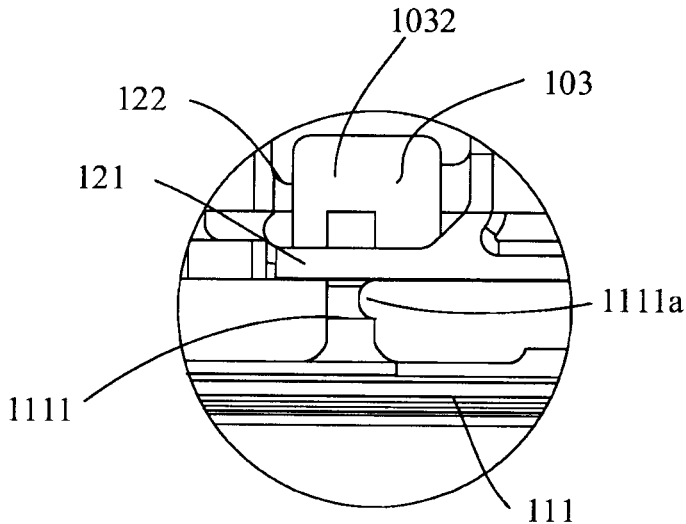
FIG. 7 is an amplified schematic diagram at D shown in FIG. 6.
Figure 8:
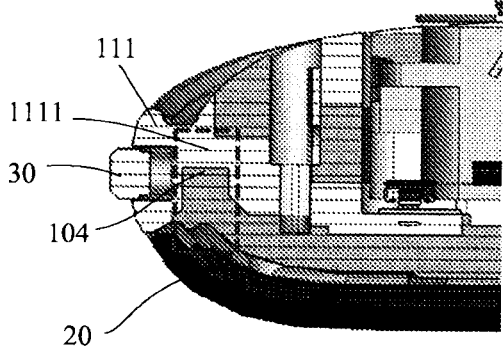
FIG. 8 is a partial cross-sectional view of a region A of an electronic device illustrated according to an example.

Please refer to FIG. 1, and if necessary, in conjunction with FIG. 2 to FIG. 8, the disclosure provides an electronic device 100, including a device body 10 and a display screen 20 arranged on the device body 10.

The device body 10 has a metal border 11 and a support frame 12 located in the electronic device 100. The metal border 11 includes a first border section 111, a first function key 30 is arranged on the first border section 111, and an antenna connection part 1111 (may also called an antenna upper frame) extending inward is arranged on an inner side of the first border section 111, so as to form a first antenna with the first border section 111 as an antenna body. A gap 105 exists between the first border section 111 and the support frame 12. The support frame 12 has an avoidance notch 103. The avoidance notch 103 accommodates an inner end of the antenna connection part 1111, and the antenna connection part 1111 and the support frame 12 are arranged at an interval.

Here, the first antenna formed with the first border section 111 as the antenna body makes it difficult for the user to hold the key part of the first antenna when using the mobile phone, which is conducive to improving the performance of the first antenna. Thus, it is conducive to improving the overall performance of the antenna of the electronic device. In addition, here, the arrangement of the avoidance notch 103 can prevent mutual interference among the support frame 12, the antenna connection part 1111, and antennas where they are located.

It needs to be noted that here, the first antenna may be a medium and high-frequency antenna. In some examples, the first antenna may be used for signal transmission of game applications. In this way, when the user plays games in a horizontal screen orientation, it can effectively avoid possible signal interference caused by a hand to the game applications, and the antenna signal transmission of the game applications is improved.

In some examples, here, the electronic device 100 is a mobile phone, and the metal border 11 and the support frame 12 are a portion of a middle frame, respectively.

In some examples, the antenna connection part 1111, the metal border 11, and the support frame 12 are integrally formed, which is convenient for production and preparation, and is conducive to ensuring an overall structural strength. Of course, in some other examples, they may also be spliced together.

In some examples, the support frame 12 has a support vertical wall 121 opposite to the metal border 11 and a support body 122 extending inward from the support vertical wall 121, and the avoidance notch 103 includes a first notch 1031 located in the support vertical wall 121 and a second notch 1032 located in the support body 122. Accordingly, the gap 105 is located between the support vertical wall 121 and the first border section 111.

It can be understood that here, the antenna connection part 1111 penetrates through the first notch 1031, and the inner end is accommodated in the second notch 1032. It needs to be noted that in some other examples, the avoidance notch 103 may also be a through-hole structure arranged on the support vertical wall 121. The antenna connection part 1111 may penetrate through the avoidance notch of the through hole structure to be connected with internal structures, such as a feed point. Alternatively, the support frame 12 may also not be provided with the support vertical wall 121, the avoidance notch 103 is directly a structure similar to the second notch 1032, and the inner end of the antenna connection part 1111 extends into the avoidance notch 103.

In some examples, a distance between the antenna connection part 1111 and the support frame 12 is greater than or equal to 1 mm, so as to ensure that mutual interference among the support frame 12, the antenna connection part 1111, and the antennas where they are located is avoided.

In some examples, the display screen 20 is a curved screen, and one side of the antenna connection part 1111 facing the display screen 20 is provided with an avoidance groove 104 opposite to a side end of the display screen 20, to reduce or even avoid the mutual interference among the display screen 20, the antenna connection part 1111, and the antennas where they are located.

In some examples, a distance between the side end of the display screen 20 and the avoidance groove 104 is greater than or equal to 1 mm, to further ensure that the mutual interference among the display screen 20, the antenna connection part 1111, and the antennas where they are located is avoided.

In some examples, the antenna connection part 1111 is provided with an inward-concave glue-grabbing structure 1111a. The glue-grabbing structure 1111a actually may also be an inward-concave notch, and the notch may be used for arranging a fixed glue or a fixed column or the like, such that after the antenna connection part 1111 is assembled on the electronic device, the structural stability of the antenna connection part 1111 and the whole metal border is improved.

In some examples, the antenna connection part 1111 has the glue-grabbing structure 1111a formed by a semicircular inward-concave curved surface, which is convenient for matching with the cylindrical fixed column or the fixed glue or the like.

In some examples, the first function key 30 has two opposite key operation parts 31 and 32 close to two ends of the first function key 30. The antenna connection part 1111 extends inward from a middle of the first border section 111, and the antenna connection part 1111 is located between the two key operation parts 31 and 32. For example, the antenna connection part 1111 may extend inward from a center of the first border section 111, or the antenna connection part 1111 may extend inward from an inner side of a center of the first function key 30.

In some examples, the first function key 30 is a volume key, and the two key operation parts are a volume increase operation part and a volume decrease operation part, respectively.

In some examples, the metal border 11 further includes a second border section 112 adjacent to the first border section 111. A first break joint 101 is formed between the first border section 111 and the second border section 112. The arrangement of the above first antenna, especially the antenna connection part 1111 extending inward from the middle of the first border section 111, can ensure the layout of other antennas formed by the second border section 112 and other border sections (such as a third border section 113 below) while improving the performance of the first antenna.

A second function key 40 is arranged on the second border section 112. The second function key 40 may be an on-off key (namely a power-on key).

In some examples, a flexible circuit board 50 is arranged on one side of the support vertical wall 121 facing the metal border 11, and the flexible circuit board 50 has a circuit board notch 504 corresponding to the first notch 1031, such that the antenna connection part 1111 extends inward.

In some examples, the flexible circuit board 50 includes a first part 501 and a second part 502 located on two opposite sides of the circuit board notch 504 and a third part 503 connected between the first part 501 and the second part 502, and a touch part 611 and a touch part 612 are arranged on the first part 501 and the second part 502 respectively. Here, the third part 503 may be understood as a circuit board part located above the circuit board notch 504 shown in FIG. 3.

A metal connection line 62 connected with the two touch parts 611 and 612 is arranged on the flexible circuit board 50, and a portion of the metal connection line 62 is arranged on the third part 503, so that the metal connection line 62 avoids the antenna connection part 1111 correspondingly, and can ensure a distance of more than 1 mm from the antenna connection part 1111 to avoid the mutual interference between the two.

Optionally, a power connection end (or a control module connection end) of the metal connection line 62 may be approximately located on an inner side of the first break joint 101. The portion of the metal connection line 62 is arranged on the third part 503 to extend to a position of the first part 501, so as to be connected with the touch part 611.

In some examples, the metal border 11 further includes a third border section 113 located on one side of the first border section 111, facing away from the second border section 112, and a second break joint 102 exists between the third border section 113 and the first border section 111. The electronic device 100 further includes a second antenna, and the third border section 113 serves as an antenna body of the second antenna.

The second antenna may be a wifi antenna.

Figure 9:
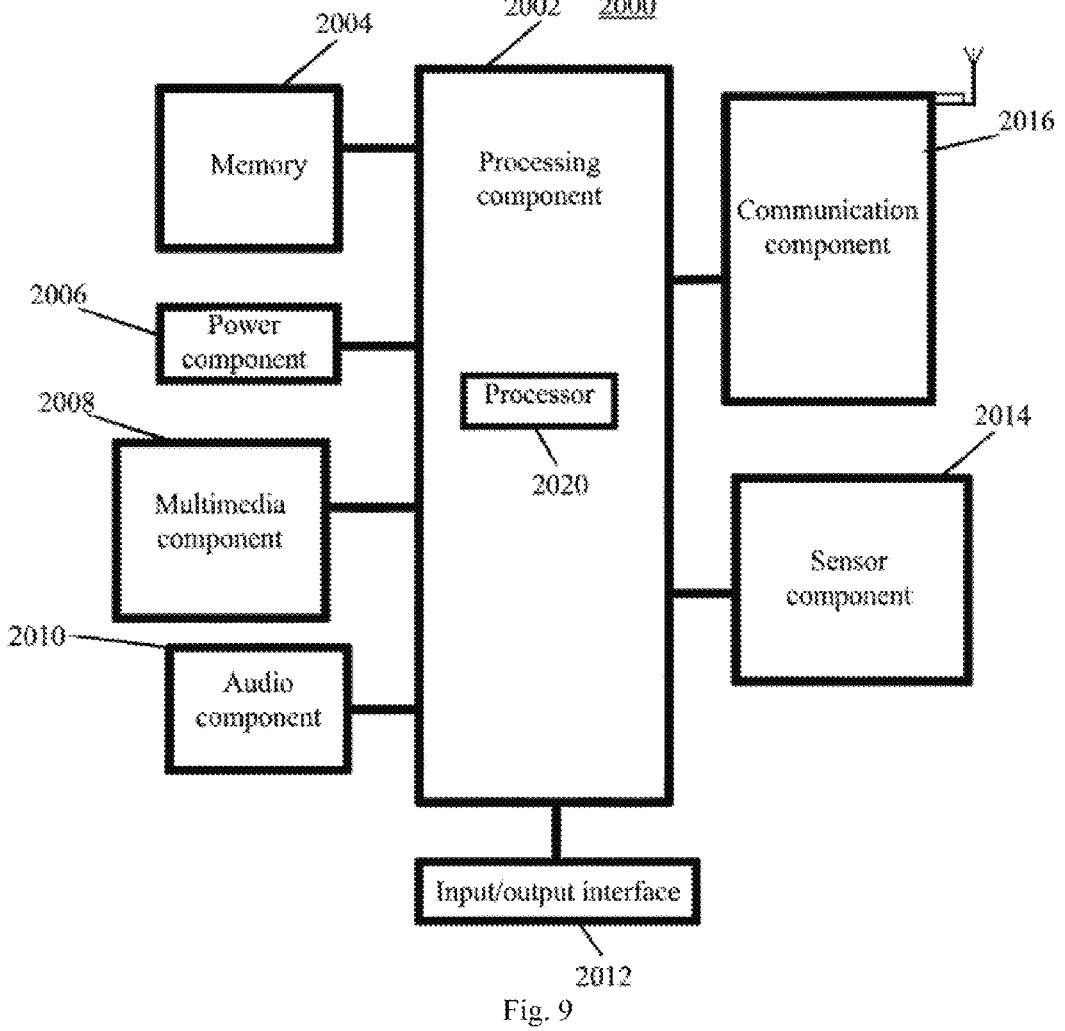
FIG. 9 is a block diagram of an electronic device illustrated according to an example.

FIG. 9 is a block diagram of an electronic device illustrated according to an example. For instance, an apparatus 2000 may be a mobile phone, a tablet computer, a wearable device, or the like.

Referring to FIG. 9, the apparatus 2000 may include one or more of the following components: a processing component 2002, a memory 2004, a power component 2006, a multimedia component 2008, an audio component 2010, an input/output (I/O) interface 2012, a sensor component 2014, and a communication component 2016. The audio component 2010 and the above audio component 10 may be the same components or different components.

The processing component 2002 typically controls an overall operation of the apparatus 2000, such as operations associated with display, telephone calls, data communication, camera operations, and recording operations. The processing component 2002 may include one or more processors 2020 to execute instructions to complete all or part of the steps of the related method. In addition, the processing component 2002 may include one or more modules to facilitate interaction between the processing component 2002 and other components. For instance, the processing component 2002 may include a multimedia module to facilitate interaction between the multimedia component 2008 and the processing component 2002.

The memory 2004 is configured to store various types of data to support operations at the apparatus 2000. Instances of these data include instructions for any application or method operating on the apparatus 2000, contact data, phonebook data, messages, pictures, videos, etc. The memory 2004 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 2006 provides power for various components of the apparatus 2000. The power component 2006 may include a power management system, one or more power sources, and other components associated with generating, managing, and distributing power for the apparatus 2000.

The multimedia component 2008 includes a screen providing an output interface between the apparatus 2000 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, sliding, and gestures on the touch panel. The touch sensor cannot merely sense the boundary of the touch or sliding operation, but also detect the duration and pressure related to the touch or sliding operation. In some examples, the multimedia component 2008 includes a front camera and/or a rear camera. When the apparatus 2000 is in an operation mode, such as a shooting mode or a video mode, the front camera and/or the rear camera can receive external multimedia data. Each front camera and rear camera can be a fixed optical lens system or have a focal length and optical zoom capability.

The audio component 2010 is configured to output and/or input audio signals. For instance, the audio component 2010 includes a microphone (MIC) configured to receive an external audio signal when the apparatus 2000 is in the operation mode, such as a call mode, a recording mode, and a speech recognition mode. The received audio signal may be further stored in the memory 2004 or transmitted via the communication component 2016. In some examples, the audio component 2010 further includes a speaker for outputting an audio signal.

The I/O interface 2012 provides an interface between the processing component 2002 and a peripheral interface module, which can be a keyboard, a click wheel, a button, etc. These buttons may include, but are not limited to: a home button, volume buttons, a start button, and a lock button.

The sensor component 2014 includes one or more sensors for providing state evaluation of various aspects of the apparatus 2000. For example, the sensor component 2014 can detect an on/off state of the apparatus 2000 and the relative positioning of the components, for example, the components are a display and a keypad of the apparatus 2000. The sensor component 2014 can also detect the change of the position of the apparatus 2000 or one component of the apparatus 2000, the presence or absence of user contact with the apparatus 2000, the azimuth or acceleration/deceleration of the apparatus 2000, and a temperature change of the apparatus 2000. The sensor component 2014 may include a proximity sensor configured to detect the presence of nearby objects without any physical contact. The sensor component 2014 may further include an optical sensor, such as a CMOS or CCD image sensor, for use in imaging applications. In some examples, the sensor component 2014 may further include an acceleration sensor, a gyroscope sensor, a magnetic sensor, a pressure sensor, or a temperature sensor.

The communication component 2016 is configured to facilitate wired or wireless communication between the apparatus 2000 and other devices. The apparatus 2000 may access a wireless network based on a communication standard, such as WiFi, 2G, 3G, 4G LTE, 5G NR, or their combination. In an example, the communication component 2016 receives a broadcast signal or broadcast-related information from an external broadcast management system via a broadcast channel. In an example, the communication component 2016 further includes a near field communication (NFC) module to facilitate short-range communication. For instance, the NFC module may be implemented based on a radio frequency identification (RFID) technology, an infrared data association (IrDA) technology, an ultra wideband (UWB) technology, a Bluetooth (BT) technology, and other technologies.

In an example, the apparatus 2000 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for performing the related methods.

In an example, a non-transitory computer-readable storage medium including instructions, such as the memory 2004 including instructions, which can be executed by the processor 2020 of the apparatus 2000 to complete the related methods, is also provided. For example, the non-temporary computer-readable storage medium may be an ROM, a random access memory (RAM), a CD-ROM, a magnetic tape, a floppy disk, an optical data storage device, etc.

Other implementations of the disclosure will be apparent to those skilled in the art from consideration of the specification and practice of the disclosure disclosed here. The disclosure is intended to cover any variations, uses, or adaptations of the disclosure following its general principles and including such departures from the disclosure as come within known or customary practice in the art. The specification and examples are merely considered as illustrative, and the true scope and spirit of the disclosure are indicated by the following claims.

It will be appreciated that the disclosure is not limited to the exact construction that has been described above and illustrated in the accompanying drawings, and that various modifications and variations may be made without departing from its scope. The scope of the disclosure is merely limited by the appended claims.

EMBODIMENTS

A first embodiment provides an electronic device, including: a metal border, where the metal border includes an adjacent first border section, a first function key is arranged on the first border section, and an antenna connection part extending inward is arranged on an inner side of the first border section, to form a first antenna with the first border section as an antenna body; and a support frame, arranged on an inner side of the metal border, where the support frame has an avoidance notch, the antenna connection part penetrates through the avoidance notch, or the avoidance notch accommodates an inner end of the antenna connection part, and the antenna connection part and the support frame are arranged at an interval.

A second embodiment includes the electronic device of the first embodiment, wherein the support frame has a support vertical wall opposite to the metal border and a support body extending inward from the support vertical wall, and the avoidance notch includes a first notch located in the support vertical wall and a second notch located in the support body.

A third embodiment includes the electronic device of the first embodiment, wherein a distance between the antenna connection part and the support frame is greater than or equal to 1 mm.

A fourth embodiment includes the electronic device of the first embodiment, wherein the electronic device has a display screen, the display screen is a curved screen, and one side of the antenna connection part facing the display screen is provided with an avoidance groove opposite to a side end of the display screen.

A fifth embodiment includes the electronic device of the second embodiment, wherein a flexible circuit board is arranged on one side of the support vertical wall facing the metal border, and the flexible circuit board has a circuit board notch corresponding to the first notch.

A sixth embodiment includes the electronic device of the fifth embodiment, wherein the flexible circuit board includes a first part and a second part located on two opposite sides of the circuit board notch, and a third part connected between the first part and the second part, and the first part and the second part are each provided with a touch part; and a metal connection line connected with the two touch parts is arranged on the flexible circuit board, and a portion of the metal connection line is arranged on the third part.

A seventh embodiment includes the electronic device of the sixth embodiment, wherein the first function key has two opposite key operation parts close to two ends, and the two key operation parts are arranged corresponding to the two touch parts respectively; the first function key is a volume key, and the two key operation parts are a volume increase operation part and a volume decrease operation part respectively; and/or, the metal border includes a second border section adjacent to the first border section, a first break joint exists between the second border section and the first border section, a second function key is arranged on the second border section, and the second function key is an on-off key.

An eighth embodiment includes the electronic device of the fourth embodiment, wherein a distance between the side end of the display screen and the avoidance groove is greater than or equal to 1 mm.

A ninth embodiment includes the electronic device of the first embodiment, wherein the antenna connection part is provided with an inward-concave glue-grabbing structure.

A tenth embodiment includes the electronic device of the ninth embodiment, wherein the antenna connection part has the glue-grabbing structure formed by a semicircular inward-concave curved surface.

An eleventh embodiment includes the electronic device of the second embodiment, wherein the first function key has two opposite key operation parts close to two ends, the antenna connection part extends inward from a middle of the first border section, and the antenna connection part is located between the two key operation parts.

A twelfth embodiment includes the electronic device of the first embodiment, wherein the metal border includes a second border section adjacent to the first border section, a first break joint exists between the second border section and the first border section, the metal border further includes a third border section located on one side of the first border section facing away from the second border section, and a second break joint exists between the third border section and the first border section; and the electronic device further includes a second antenna, and the third border section serves as an antenna body of the second antenna.

A thirteenth embodiment includes the electronic device of the first embodiment, wherein the antenna connection part, the metal border, and the support frame are integrally formed.

A fourteenth embodiment includes the electronic device according to any one of the first to thirteenth embodiments, wherein the electronic device is a mobile phone, and the metal border and the support frame are a portion of a middle frame, respectively.

What is claimed is:

1. An electronic device, comprising:
a metal border, wherein the metal border comprises
a first border section,
a first function key arranged on the first border section, and
an antenna connection part extending inward and arranged on an inner side of the first border section, so as to form a first antenna with the first border section as an antenna body; and a support frame arranged on an inner side of the metal border, wherein the support frame has an avoidance notch, the antenna connection part penetrates through the avoidance notch, or the avoidance notch accommodates an inner end of the antenna connection part, the antenna connection part and the support frame are arranged at an interval, the antenna connection part is provided with an inward-concave structure comprising an inward-concave notch, and the inward-concave notch is configured to be arranged with a fixed glue.

2. The electronic device according to claim 1, wherein the support frame has a support vertical wall opposite to the metal border and a support body extending inward from the support vertical wall, and the avoidance notch comprises a first notch located in the support vertical wall and a second notch located in the support body.

3. The electronic device according to claim 1, wherein a distance between the antenna connection part and the support frame is greater than or equal to 1 mm.

4. The electronic device according to claim 1, further comprising:

a display screen, wherein the display screen is a curved screen, and one side of the antenna connection part facing the display screen is provided with an avoidance groove opposite to a side end of the display screen.

5. The electronic device according to claim 2, further comprising:

a flexible circuit board arranged on one side of the support vertical wall facing the metal border, wherein the flexible circuit board has a circuit board notch corresponding to the first notch.

6. The electronic device according to claim 5, wherein the flexible circuit board comprises a first part and a second part located on two opposite sides of the circuit board notch, and a third part connected between the first part and the second part;

the first part is provided with a first touch part and the second part is provided with a second touch part;

a metal connection line connected with the first and second touch parts is arranged on the flexible circuit board; and a portion of the metal connection line is arranged on the third part.

7. The electronic device according to claim 6, wherein the first function key has two opposite key operation parts close to two ends of the first function key;

the two opposite key operation parts are arranged corresponding to the two touch parts respectively;

the first function key is a volume key; and the two opposite key operation parts are a volume increase operation part and a volume decrease operation part respectively.

8. The electronic device according to claim 6, wherein the metal border comprises a second border section adjacent to the first border section, a first break joint exists between the second border section and the first border section, a second function key is arranged on the second border section, and the second function key is an on-off key.

9. The electronic device according to claim 6, wherein the first function key has two opposite key operation parts close to two ends of the first function key;

the two opposite key operation parts are arranged corresponding to the two touch parts respectively;

the first function key is a volume key;

the two opposite key operation parts are a volume increase operation part and a volume decrease operation part respectively;

the metal border comprises a second border section adjacent to the first border section;

a first break joint exists between the second border section and the first border section;

a second function key is arranged on the second border section; and the second function key is an on-off key.

10. The electronic device according to claim 4, wherein a distance between the side end of the display screen and the avoidance groove is greater than or equal to 1 mm.

11. The electronic device according to claim 1, wherein the antenna connection part has the inward-concave structure formed by a semicircular inward-concave curved surface.

12. The electronic device according to claim 2, wherein the first function key has two opposite key operation parts close to two ends of the first function key, the antenna connection part extends inward from a middle of the first border section, and the antenna connection part is located between the two opposite key operation parts.

13. The electronic device according to claim 1, further comprising:

a second antenna, wherein the metal border comprises a second border section adjacent to the first border section, a first break joint exists between the second border section and the first border section, the metal border further comprises a third border section located on one side of the first border section facing away from the second border section, a second break joint exists between the third border section and the first border section, and the third border section serves as an antenna body of the second antenna.

14. The electronic device according to claim 1, wherein the antenna connection part, the metal border, and the support frame are integrally formed.

15. The electronic device according to claim 1, wherein the electronic device is a mobile phone, and the metal border and the support frame are a portion of a middle frame respectively.

16. The electronic device according to claim 15, wherein the support frame has a support vertical wall opposite to the metal border and a support body extending inward from the support vertical wall, and the avoidance notch comprises a first notch located in the support vertical wall and a second notch located in the support body.

17. The electronic device according to claim 16, wherein the first function key has two opposite key operation parts close to two ends of the first function key;

the two opposite key operation parts are arranged corresponding to two touch parts respectively, on two opposite sides of the first notch;

the first function key is a volume key; and the two opposite key operation parts are a volume increase operation part and a volume decrease operation part respectively.

18. The electronic device according to claim 17, wherein the metal border comprises a second border section adjacent to the first border section, a first break joint exists between the second border section and the first border section, a second function key is arranged on the second border section, and the second function key is an on-off key.

19. The electronic device according to claim 15, further comprising a second antenna, wherein the metal border comprises a second border section adjacent to the first border section, a first break joint exists between the second border section and the first border section, the metal border further comprises a third border section located on one side of the first border section facing away from the second border section, a second break joint exists between the third border section and the first border section, and the third border section serves as an antenna body of the second antenna.

* * * * *